United States Patent
Hanai et al.

(10) Patent No.: US 7,996,661 B2
(45) Date of Patent: Aug. 9, 2011

(54) LOOP PROCESSING COUNTER WITH AUTOMATIC START TIME SET OR TRIGGER MODES IN CONTEXT RECONFIGURABLE PE ARRAY

(75) Inventors: Takashi Hanai, Kawasaki (JP); Shinichi Sutou, Kawasaki (JP); Masaki Arai, Kawasaki (JP); Mitsuharu Wakayoshi, Fukuoka (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 12/232,462

(22) Filed: Sep. 17, 2008

(65) Prior Publication Data

US 2009/0083527 A1    Mar. 26, 2009

(30) Foreign Application Priority Data

Sep. 20, 2007    (JP) ................................ 2007-244314

(51) Int. Cl.
*G06F 9/30*    (2006.01)
(52) U.S. Cl. .......................................... 712/241; 712/15
(58) Field of Classification Search .................. None
See application file for complete search history.

(56) References Cited

U.S. PATENT DOCUMENTS

| 7,529,917 B2* | 5/2009 | Ryu et al. ....................... 712/241 |
| 7,669,042 B2* | 2/2010 | Pisek et al. ..................... 712/241 |
| 2005/0283743 A1* | 12/2005 | Mulholland et al. .............. 716/1 |
| 2006/0004993 A1* | 1/2006 | Uriu et al. ....................... 712/226 |
| 2006/0010306 A1* | 1/2006 | Saito et al. ..................... 712/226 |
| 2006/0048113 A1* | 3/2006 | Ozone et al. ................... 717/144 |
| 2006/0107028 A1* | 5/2006 | Meuwissen et al. .......... 712/241 |
| 2006/0182135 A1* | 8/2006 | Pisek ............................. 370/406 |

FOREIGN PATENT DOCUMENTS

| JP | 2003-518666 | 6/2003 |
| WO | WO 01/45258 A2 | 6/2001 |

* cited by examiner

*Primary Examiner* — Kenneth S Kim
(74) *Attorney, Agent, or Firm* — Staas & Halsey LLP

(57) ABSTRACT

A dynamic reconfigurable circuit that implements optional processing by dynamically switching a processing content of a reconfigurable processing element (PE) and a connection content between the PEs in accordance with a context, includes: a configuration register section for setting a content of loop processing on the basis of the context, the loop processing content including an output source of an output signal from each of a set of the reconfigured PEs, an output destination of the output signal, and a condition for outputting the output signal to the output destination; and at least one counter circuit including a loop control section and an output register section that implement the set loop processing, that count the number of implementations of the loop processing implemented by the loop control section, and that output the output signal to the output destination based on the counted number of implementations and the condition.

8 Claims, 14 Drawing Sheets

FIG.10

| clock | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| loop0 (k) | PRDI | N | T | N | N | N | N | N | N | N | N | N | N | N | N | N | N | N | N | N | N | N | N | N | - |
| | CI | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | - |
| | PRDO | N | N | T | F | F | T | F | F | T | F | F | T | F | F | T | F | F | T | F | F | T | F | F | - |
| | DO | - | 1 | 0 | 1 | 2 | 0 | 1 | 2 | 0 | 1 | 2 | 0 | 1 | 2 | 0 | 1 | 2 | 0 | 1 | 2 | 0 | 1 | 2 | - |
| loop1 (j) | PRDI | N | N | T | F | F | T | F | F | T | F | F | T | F | F | T | F | F | T | F | F | T | F | F | - |
| | CI | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | - |
| | PRDO | N | N | N | T | F | T | F | F | T | F | F | F | T | F | F | F | F | F | F | F | F | F | F | - |
| | DO | - | - | - | 0 | 0 | 0 | 0 | 0 | 1 | 2 | 2 | 2 | 0 | 0 | 0 | 1 | 1 | 1 | 2 | 2 | 2 | 0 | 0 | - |
| loop2 (i) | PRDI | N | N | N | T | T | T | F | F | F | F | F | F | T | F | F | F | F | F | F | F | F | T | F | - |
| | CI | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | - |
| | PRDO | N | N | N | N | T | T | T | T | T | T | T | T | T | T | T | T | T | T | T | T | T | T | T | - |
| | CO | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | - |
| | DO | - | - | - | - | 0 | 0 | 0 | 0 | 0 | 0 | 0 | 0 | 0 | 1 | 1 | 1 | 1 | 1 | 1 | 1 | 1 | 1 | 1 | - |

FIG.12

| clock | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| loop0 (i) | PRDI | N | T | N | N | N | N | N | N | N | N | N | N | N | N | N | N | N | N | N | N | N | - |
| | CI | 0 | 0 | 0 | 0 | 0 | 0 | 0 | 0 | 0 | 0 | 0 | 0 | 0 | 0 | 0 | 0 | 0 | 0 | 0 | 0 | 0 | - |
| | PRDO | N | N | T | T | T | T | T | T | T | T | T | T | F | N | N | N | N | N | N | N | N | - |
| | DO | - | - | 0 | 1 | 2 | 3 | 4 | 5 | 6 | 7 | 8 | 9 | - | - | - | - | - | - | - | - | - | - |
| loop1 (j) | PRDI | N | N | N | N | N | N | N | N | N | N | N | N | T | N | N | N | N | N | N | N | - |
| | CI | 0 | 0 | 0 | 0 | 0 | 0 | 0 | 0 | 0 | 0 | 0 | 0 | 0 | 0 | 0 | 0 | 0 | 0 | 0 | 0 | 0 | - |
| | PRDO | N | N | N | N | N | N | N | N | N | N | N | N | N | T | T | T | T | T | T | T | F | - |
| | DO | - | - | - | - | - | - | - | - | - | - | - | - | - | 0 | 2 | 4 | 6 | 8 | 10 | 12 | - | - |

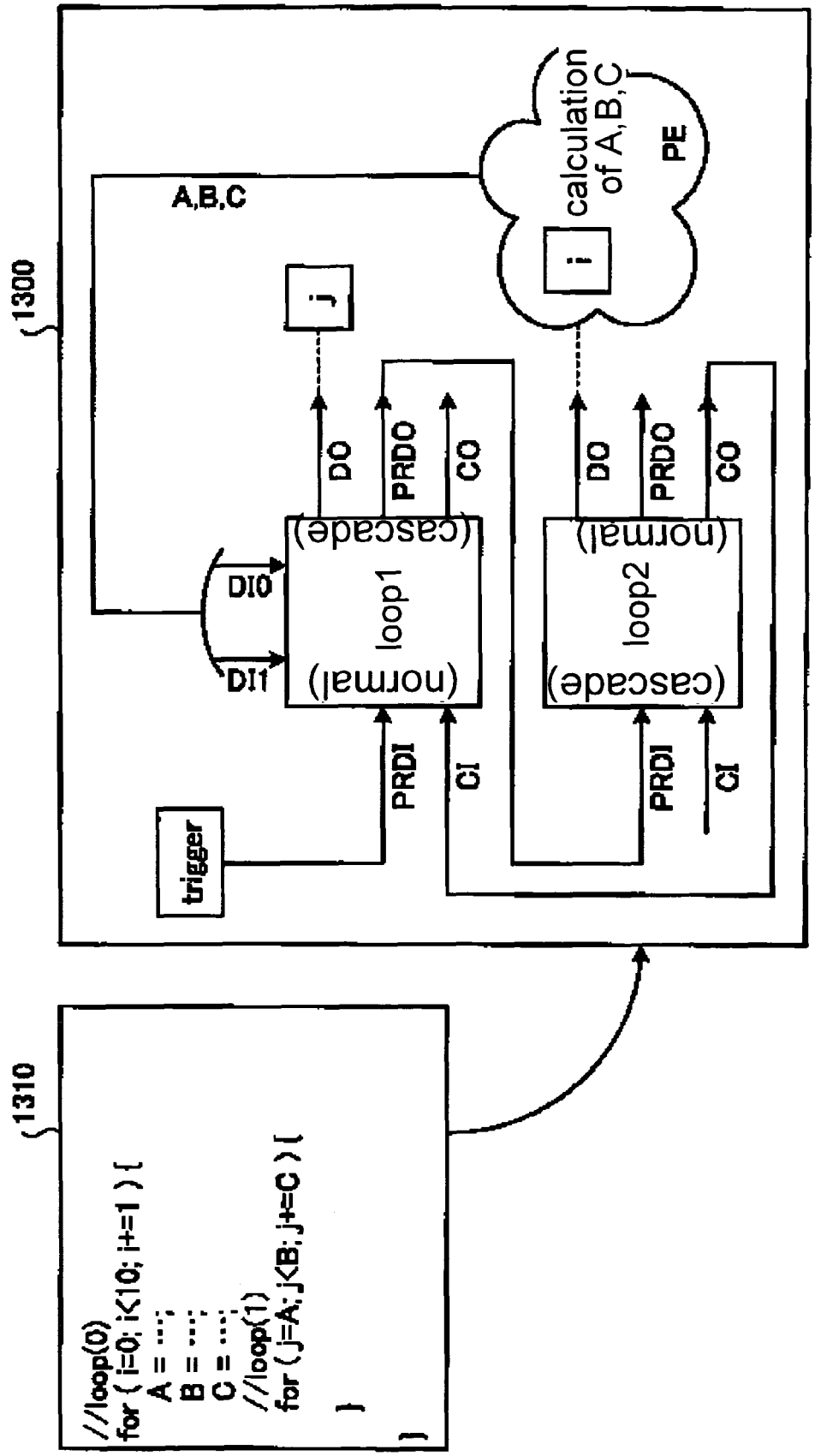

LOOP PROCESSING COUNTER WITH AUTOMATIC START TIME SET OR TRIGGER MODES IN CONTEXT RECONFIGURABLE PE ARRAY

CROSS REFERENCE TO RELATED APPLICATION

This application is based upon and claims the benefit of priority from the prior Japanese Patent Application NO. 2007-244314 filed on Sep. 20, 2007, the entire contents of which are incorporated herein by reference.

BACKGROUND

1. Field

The embodiments discussed herein are relates to a counter circuit provided in a dynamic reconfigurable circuit that implements optional processing by dynamically switching a processing content of the reconfigurable processing elements and a connection content between the reconfigurable processing elements. The embodiments discussed herein also are related to the dynamic reconfigurable circuit and a loop processing control method used therein.

2. Description of the Related Art

Conventionally, the dynamic reconfigurable circuit is characterized by its capability of changing instructions from a computing unit and the connection between the computing units inside the circuit during an operation. Specifically, the dynamic reconfigurable circuit includes a plurality of reconfigurable processing elements (hereinafter, referred to as PEs). Configuration contents of the dynamic reconfigurable circuit are described as information, referred to as contexts, that indicates setting of an operation of each PE, and that of connections between the PEs. When the circuit is reconfigured, the computing processing contents or connections between PEs are changed in accordance with the contexts.

In the dynamic reconfigurable circuit, in accordance with the above-described contexts, processing contents or connection destinations of the PEs included in the circuit are sequentially changed. That is, even when different processings are performed, by performing the processings by dividing in a time axis direction, the PEs can be shared among the different processings. This brings about an advantage of allowing a reduction in the size of hardware in the overall dynamic reconfigurable circuit. Generally, in such dynamic reconfigurable circuit based on the contexts, a counter circuit is used for controlling the start and stop of the execution of each context. Specifically, a data-driven-reconfigurable counter is employed (for example, refer to Japanese Unexamined Patent Application Publication No. 2003-518666).

However, the conventional data-driven-reconfigurable counter only has a specialized function for application mounted in the dynamic reconfigurable circuit. Accordingly, if the counter circuit is mounted using a high-level language such as C language, it is difficult to perform count processing corresponding to so-called loop processing such as a "for" sentence or a "while" sentence.

Specifically, when a loop processing in the C language, which is a high-level language, is applied to the dynamic reconfigurable circuit, the configuration of the counter circuit must be changed to a configuration capable of counting any multiple loops described in the C language. However, because a maximum number of the multiple loops is determined according to specifications of the counter, each parameter in the loop processing must be changed in accordance with the specifications. Thus, the conventional dynamic reconfigurable circuit may not implement the loop processing described in the high-level language such as the C language. This causes a problem that implementable processings in the dynamic reconfigurable circuit will be undesirably limited.

Furthermore, in the conventional data-driven counter circuit, a counting operation is starts or controlled with a valid data inputted from the outside of the dynamic reconfigurable circuit as a trigger. Accordingly, when attempting to generate data to be an input to a PE in the dynamic reconfigurable circuit, a trigger signal indicating a start timing of the counter circuit cannot be generated.

Specifically, in the context switching in the dynamic reconfigurable circuit, in order to indicate a start timing of the counter circuit, it is preferable to use a control signal indicating termination timing of processing by a context currently being executed. However, in the case of an address count processing in the data-driven counter circuit, since a valid data input from the outside is used as a start trigger, it is not possible to use the internally generated control signal as a start indication of the counter circuit.

Also, in the case where, at a point of time when a particular loop processing having been ended, another loop processing is to be started, it is preferable to use an identical trigger signal for the start of a pre-stage counter circuit and the stop of a post-stage counter circuit. However, in the case of the data-driven counter circuit, since it is also impossible to determine the end of the pre-stage counter based on the valid data read from the pre-stage counter, another control must be added, which results in an increase in the number of PEs to be used.

In this manner, in the conventional counter circuit, it is not possible to output a signal corresponding to loop processing to be implemented at optional timing. In the dynamic reconfigurable circuit, therefore, when loop processing based on a description in a high-level language is implemented, extra PEs for the control is needed, which raises a problem of increasing the size of the hardware.

SUMMARY

According to an aspect of the present invention, there is provided a counter circuit disposed in dynamic reconfigurable circuit that includes a set of reconfigurable processing elements (hereinafter, referred to as PEs) and that implements optional processing by dynamically switching a processing content of the PE and a connection content between the PEs in accordance with a context that describes the contents, the counter circuit comprising: setting means for setting a content of loop processing on the basis of the context, the loop processing content including an output source of an output signal from each of the set of the dynamically reconfigured PEs, an output destination of the output signal, and a condition for outputting the output signal to the output destination; implementation means for implementing the loop processing of which the content has been set by the setting means; and count means for counting the number of implementations of the loop processing implemented by the implementation means, and outputting the output signal to the output destination on the basis of the counted number of implementations and the condition.

According to another aspect of the present invention, there is provided dynamic reconfigurable circuit that includes a set of reconfigurable processing elements (hereinafter, referred to as PEs) and at least one counter circuit, and that implements optional processing by dynamically switching a processing content of the PE and a connection content between the PEs in accordance with a context that describes the contents, the at least one counter circuit comprising: setting means for setting a content of loop processing on the basis of the context, the loop processing content including an output source of an output signal from each of the set of the dynamically reconfigured PEs, an output destination of the output signal, and a condition for outputting the output signal to the output destination; implementation means for implementing the loop processing of which the content has been set by the setting means; and count means for counting the number of implementations of the loop processing implemented by the implementation means, and for outputting the output signal to the output destination on the basis of the counted number of implementations and the condition.

BRIEF DESCRIPTION OF THE DRAWINGS

FIG. 10 is a timing chart illustrating input/output values in the triple loop processing according to the embodiment of the present invention;

FIG. 12 is a timing chart illustrating input/output values in the loop sequential processing according to the embodiment of the present invention; and FIG. 13 is a representation illustrating an example of a rewrite processing of loop parameters according to the embodiment of the present invention.

DESCRIPTION OF THE PREFERRED EMBODIMENT

Figure 1:
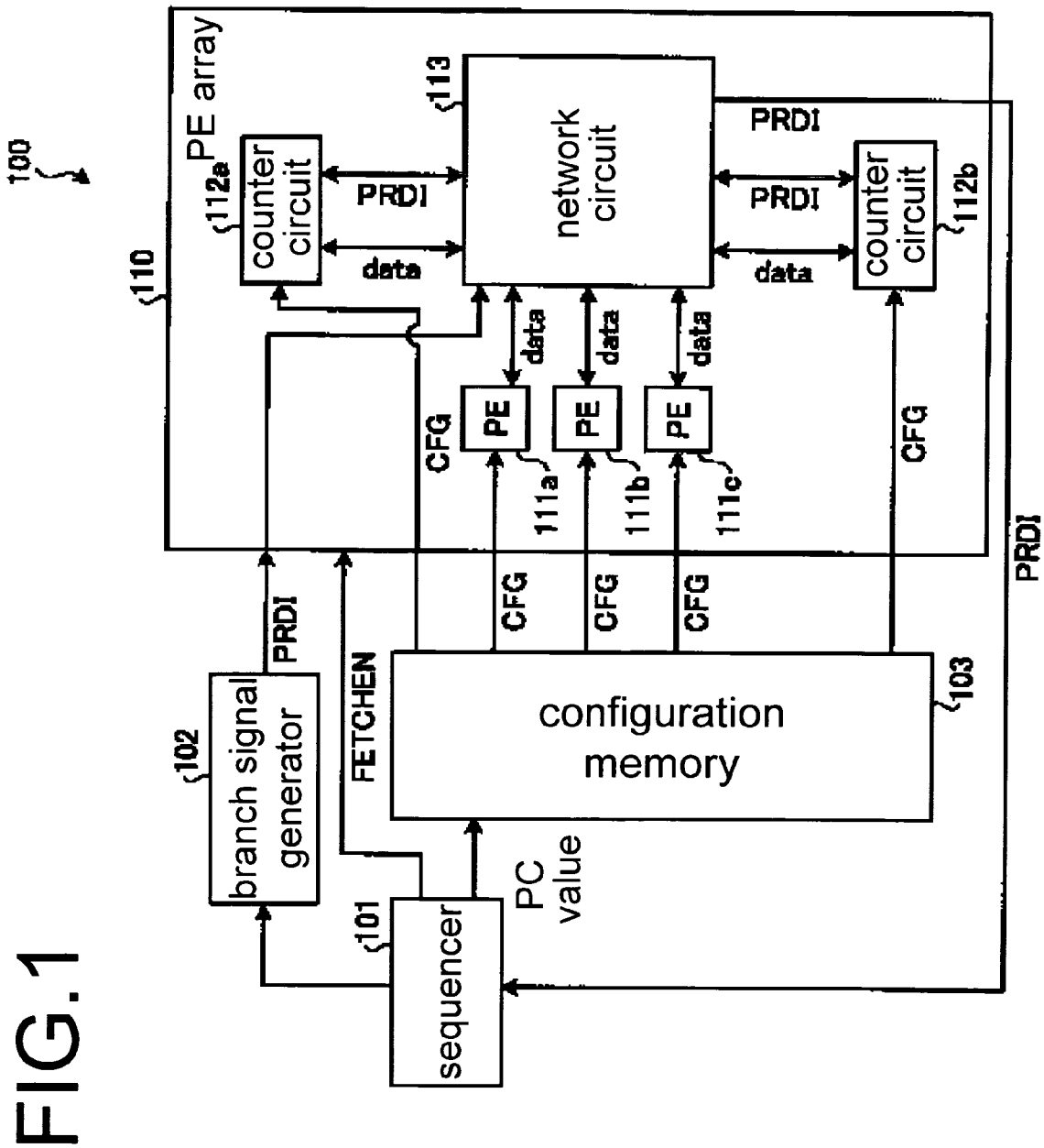
FIG. 1 is a block diagram illustrating dynamic reconfigurable circuit according to an embodiment of the present invention.

Hereinafter, a counter circuit, reconfigurable circuit, and a loop processing control method according to a preferred embodiments will be described with reference to the attached drawings.
Configuration of Dynamic Reconfigurable Circuit First, a configuration of dynamic reconfigurable circuit according to the embodiment is explained. FIG. 1 is a block diagram illustrating the dynamic reconfigurable circuit according to the embodiment. As illustrated in FIG. 1, the dynamic reconfigurable circuit 100 includes a sequencer 101, a condition branch signal generator 102, a configuration memory 103, and a PE array 110.

The sequencer 101 outputs a PC value for implementing a context corresponding to an instruction from a user or an upper program. The PC value outputted from the sequencer 101 is inputted into the configuration memory 103. The sequencer 101 also outputs FETCHEN to the PE array 110 as a configuration data read request signal.

Moreover, the sequencer 101 outputs an instruction for generating a condition branch signal (predicate signal; hereinafter referred to as "PRDI (for input signal)/PRDO (for output signal)" to the condition branch signal generator 102 with a context switching as a trigger. The PRDI is a two-bit signal, and used to indicate a start and stop of context switching. Specifically, if the PRDI is "11", it means that a condition is satisfied, and if the PRDI is "10", it means that the condition is not satisfied. If the PRDI is "0x", it means that the condition is invalid.

The condition branch signal generator 102 generates a PRDI in response to an instruction for generating the PRDI inputted from the sequencer 101. The generated PRDI is outputted to a network circuit 113 in the PE array 110.

The configuration memory 103 stores contexts that have been described in advance. The configuration memory 103 reads a context corresponding to a PE value inputted from the sequencer 101. Then, the configuration memory 103 outputs configuration data (configuration; CFG) described in the read context to PEs 111 (PE 111a to PE 111c) or counter circuits 112 (counter circuit 112a and 112b) that are disposed in the PE array 110 described below.

The PE array 110 is a functional section that executes a processing corresponding to a context read by the configuration memory 103. The PE array 110 includes the plurality of PEs 111 (e.g., PE 111a to PE 111c) serving as operators, the counter circuit 112 (e.g., 112a to 112b), and a network circuit 113 serving as a variable connection section that switches a connection of input/output value (data) of each operator.

The PEs 111 perform predetermined calculations according to a description of a context. When a context is to be executed by the dynamic reconfigurable circuit 100, configuration data described in the context to be implemented is inputted from the configuration memory 103 to the PEs 111. Then, the PEs 111 performs arithmetic processing corresponding to the inputted configuration data until the context is switched.

The counter circuit 112 performs a predetermined loop processing according to a description of a context, and counts the number of implementations of the loop processings. The counted result by the counter circuit 112 is outputted to the network circuit 113 as a PRDI.
Parameter Setting Now, a parameter setting according to configuration data is described. Common dynamic reconfigurable circuit has various parameter settings corresponding to operational contents to be implemented by PEs. Here, however, a description will be made focusing on a parameter setting in a loop processing to be implemented by the counter circuits 112 characterizing the dynamic reconfigurable circuit 100.

Figure 2:
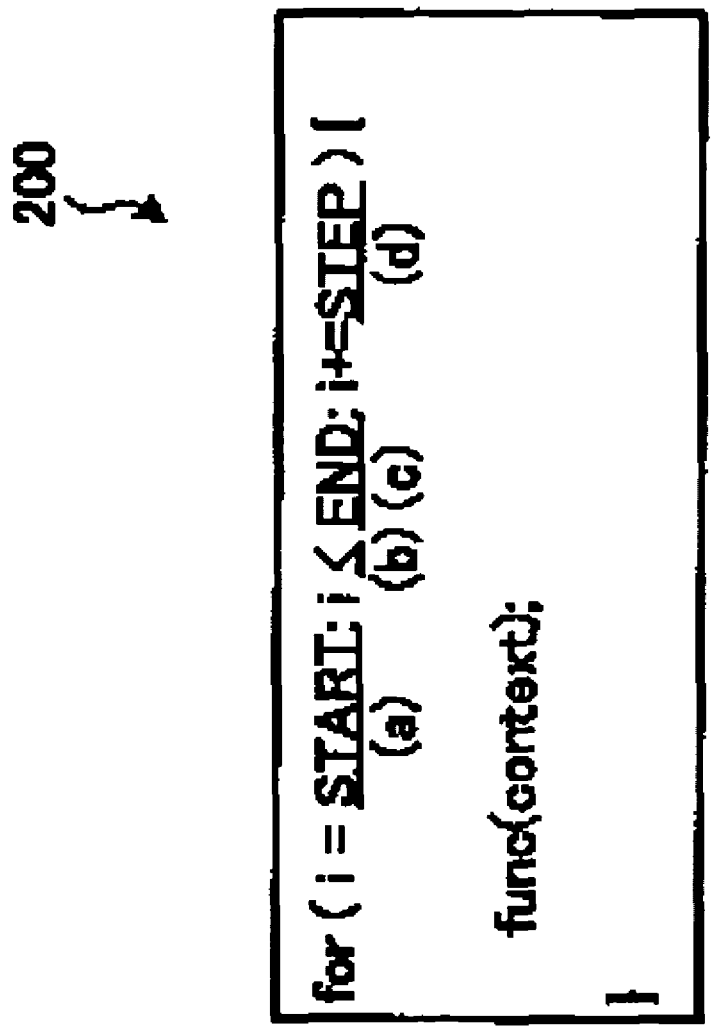
FIG. 2 is a representation illustrating an example of a source code in configuration data of a counter circuit according to the embodiment of the present invention.

FIG. 2 is a representation illustrating an example of a source code in configuration data of the counter circuit. In the source code 200, a basic for-loop sentence is described. With the following (a), (b), (c), and (d) in the configuration of the for-loop sentence as variable parameters, configuration data corresponding to each context is set.

(a): A Start Value (an Initial Value at a Start of a Loop Processing) of the Counter (b): A Mode of a Loop Establishment Determination (a Determination Formula for Determining Whether the Number of Loop Implementations Satisfies an Upper Limit of the Number of Loop Processings); the Mode is Switched to One of Four Establishment Determinations $\{<, >, \leqq, \geqq\}$ (c): A Termination Value of a Loop Variable (d): An Inclement Value (a Value to be Added to the Number of Counts when the Determination Formula (b) is Not Satisfied) of the Loop Variable; by Specifying a Negative Number, the Counter Functions as a Decrement Counter.

The setting in (a) is stored in an internal memory "Start" (described below) in the counter circuit, and the setting in (b) is stored in an internal memory "CMP-mode" (described below) in the counter circuit. The setting in (c) is stored in an internal memory "End" (described below) in the counter circuit, and the setting in (d) is stored in an internal memory "Step" (described below) in the counter circuit 112.

As a hardware function, a functional switching between the following (e), (f), (g), and (h) can be set using the configuration data.

(e) Starting Method for the Counter

This is a method for setting at what timing the counter circuit 112 is to be started. Specifically, the setting can be performed either by an automatic start or in a trigger mode. The automatic start is a method for setting the counter circuit 112 to receive a CFG read request signal (FETCHEN) outputted from the sequencer 101 and then start an operation after a designated cycle. On the other hand, the trigger mode is a method for starting the counter circuit 112 with an input of PRDI as a trigger when the PRDI outputted from the condition branch signal generator 102 is "11" indicating an establishment. When the start method using the trigger mode is adopted, "Trigger-mode" (described below) in the internal memory in the counter circuit 112 is set to a valid state.

(f) Interval Setting in Valid Counter Output

This is a setting as to whether a count implement by the counter circuit 112 is implemented for each one clock or for each predetermined number of clocks. As described above, while the counter can be operated for each one clock, the counter can also be operated at certain intervals by performing an interval setting. When the interval setting is performed, configuration data corresponding to the interval setting is stored in an internal memory "Interval" (described below) in the counter circuit 112.

(g) Output Mode Setting

In a count processing performed by the counter circuit 112, it is set on which condition an output is to be performed from the counter circuit 112 to the outside (another PE 111, or another counter circuit 112). Specifically, a normal output mode and a cascade output mode are provided, and these modes are switched on the basis of configuration data stored in an internal memory "Output-mode" (described below) in the counter circuit 112.

Normal Output Mode

In the normal output mode, during a loop processing operation, PRDI "11" indicating an establishment is outputted. When a loop condition is satisfied, PRDI "10" is outputted. When a loop processing is stopped, PRDI "00" is outputted. If another counter circuit 112 is provided on a post-stage side, in order to stop an address counter, PRDI "10" is outputted when the loop condition is satisfied, and a cascade signal is asserted by one pulse.

Cascade Output Mode

The cascade output mode is used when the same counter circuit 112 is provided on the post-stage side by a cascade connection. During a loop processing operation, PRDI "10" is outputted. When the number of counts reaches an initial value of a loop parameter in the counter circuit 112 by a counting processing, PRDI "11" is outputted. When a loop processing is stopped, PRDI "00" is outputted.

(h) Input Mode Setting

In the input mode setting, the kind of an input upon receipt of which the counter circuit 112 is to perform a counting operation, is set. Specifically, there are provided two modes, that is, a normal input mode and a cascade input mode, and the modes are switched on the basis of configuration data stored in an internal memory "Input-mode" (described below) in the counter circuit 112.

Normal Input Mode

In the normal input mode, upon receipt of an input of PRDI "11", the counter circuit 112 starts counting processing. By the interval setting, the counter circuit 112 sets forward counting processing synchronized with a clock. It is also possible to switch to the automatic start by the above-described setting (e).

Cascade Input Mode

In the cascade input mode, upon receipt of an input of PRDI "11", the counter circuit 112 updates a counted value. Upon receipt of an input of PRDI "10", the counter circuit stops the update of the counted value. If the counter circuit is cascade-connected to another counter circuit 112 (located on a post-stage side), the other counter circuit 112 receives PRDI outputted from the pre-stage counter circuit 112 (the counter circuit that is set in the cascade output mode), and uses the PRDI for setting an address counter forward.

Configuration of Counter

Figure 3:
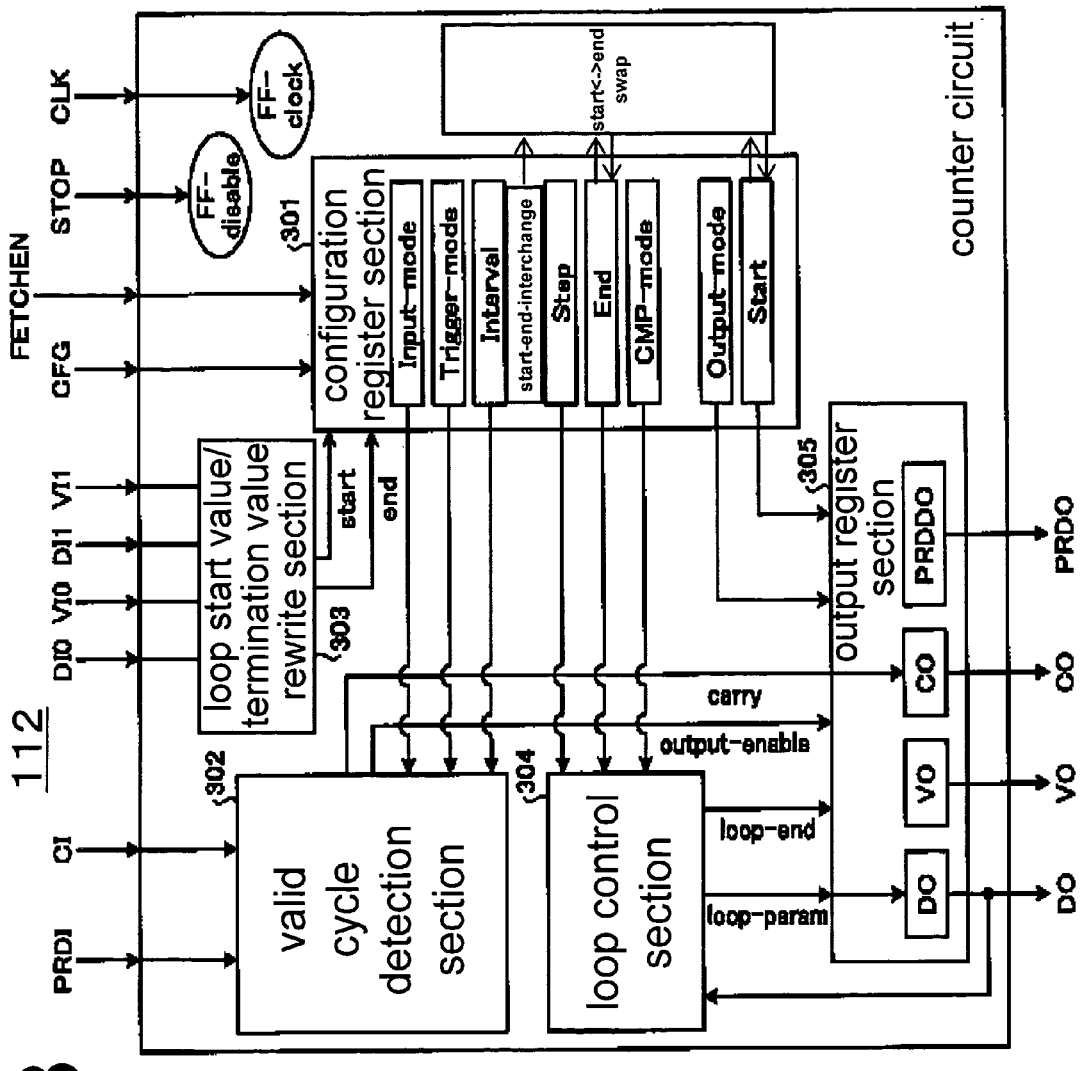
FIG. 3 is a block diagram illustrating a configuration of the counter circuit according to the embodiment of the present invention.

Next, a configuration of the counter circuit 112 is described. FIG. 3 is a block diagram illustrating the configuration of the counter circuit according to the embodiment. As illustrated in FIG. 3, the counter circuit includes a configuration register section 301, a valid cycle detection section 302, a loop start value/termination value rewrite section 303, a loop control section 304, and an output register section 305. To the functional sections 301 to 305 in the counter circuit 112, the following terminals are connected.

Input Terminal 1-1. PRDI

PRDI is a terminal for receiving an input of a condition branch signal (PRDI). Upon receipt of a condition branch signal "11", the terminal determines that a condition is satisfied, and instructs the counter circuit 112 to implement counting processing according to an input mode setting (a setting "Input-mode" (described below) in an internal register).

1-2. DI0/VI0 and DI1/VI1

DIs are terminals for receiving a data input. VIs are terminals for receiving an input of valid data that indicates valid or invalid of data inputted to DIs. When the valid data is "1", it is determined that simultaneously inputted DI data is valid.

1-3. CI

CI is a terminal for receiving an input of a cascade signal. When the cascade signal is asserted (i.e., when it is inputted as a signal in a High state), a loop count is terminated.

1-4. CFG and FETCHEN

CFG is a terminal for receiving an input of configuration data. FETCHEN is a terminal for receiving an input of a CFG read request signal (FETCHEN). FETCHEN takes in configuration data inputted to CFG into an internal register described below only when a start request signal is asserted.

Output Terminal 2-1. PRDO

PRDO is a terminal for outputting a condition branch signal (predicate: PRDO). PRDO outputs the condition branch signal according to an output mode setting (a setting "Output-mode" (described below) in an internal register) depending on a state in loop processing operation, loop processing stop, or loop condition satisfaction.

2-2. DO/VO

DO is a terminal for outputting data indicating a counted value. VO is a terminal for outputting a valid signal that indicates whether the counted value outputted from DO is valid or invalid. When a counting processing is in operation, the valid signal indicates "1", and when the counting processing is stopped, the valid signal indicates "0".

2-3. CO

CO is a terminal for outputting a cascade signal. When an output mode is set to the normal output mode, if a loop condition is satisfied, the cascade signal is asserted by one pulse. The cascade signal outputted in the normal output mode is used for stopping counting processing in the post-stage counter circuit that is set to cascade output mode.

Now, the functional sections 301 to 305 are described. With a FETCHEN signal of one pulse that is supplied to each PE at the start of context as an enable signal, the configuration register section 301 takes in configuration data inputted from the above-described CFG terminal into the following internal registers. The internal registers specifically refer to "Input-mode", "Interval", "Trigger-mode", "Step", "End", "CMP-mode", "Output-mode", and "Start". These internal registers each have a flip-flop configuration.

The valid cycle detection section 302 outputs an enable signal (output-enable) for register update to the output register section 305 according to settings in the configuration data taken in the "Input-mode", "Interval", and "Trigger-mode" out of the internal registers in the configuration register section 301.

Specifically, according to a setting content outputted from the internal memory "Input-mode", the valid cycle detection section 302 switches operations in the case where PRDI "11" indicating a satisfaction of a predetermined condition is inputted, in the following manner. Here, when PRDI other than "11" is inputted, the switching operation is not performed.

Case of Normal Input Mode

In the case of the normal input mode, upon receipt of an input of PRDI "11" indicating an establishment of a processing content from the sequencer 101, the valid cycle detection section 302 starts a counting processing. After the start of the counting operation, the valid cycle detection section 302 outputs an enable signal (output-enable) at a timing of a step set to "Interval" in synchronization with the clock. If "Trigger-mode" in the configuration register section 301 is set to the automatic start, the above-described setting becomes invalidated.

Case of Cascade Input Mode

In the case of the cascade input mode, the valid cycle detection section 302 outputs an enable signal (output-enable) for updating a loop variable upon receipt of an input of PRDI "11" indicating a satisfaction of a predetermined condition from the counter circuit 112 provided on the upper stage side.

When counting processing is stopped and a data input is valid (in the case where valid signal="1"), the loop start value/termination value rewrite section 303 writes the parameter in each of the internal registers "Start" and "End". In initial setting, DIO is allocated to the internal register "Start", and DII is allocated to the internal register "End" for rewrite. However, the allocations can be interchanged therebetween depending on a setting in the configuration data that come from the internal Register "start-end-interchange". The circuit "start-end swap" performs interchanging allocation there between according to logical value of the configuration data.

The loop control section 304 updates a counted value to a next state according to a value set in the internal register "Step" in the configuration register section 301 by configuration data. Furthermore, the loop control section 304 performs a termination determination of a loop processing according to a value set in the internal register "CMP-mode". When the loop processing is terminated by the determination processing, the loop control section 304 outputs a loop end signal to the output register section 305.

Figure 4:
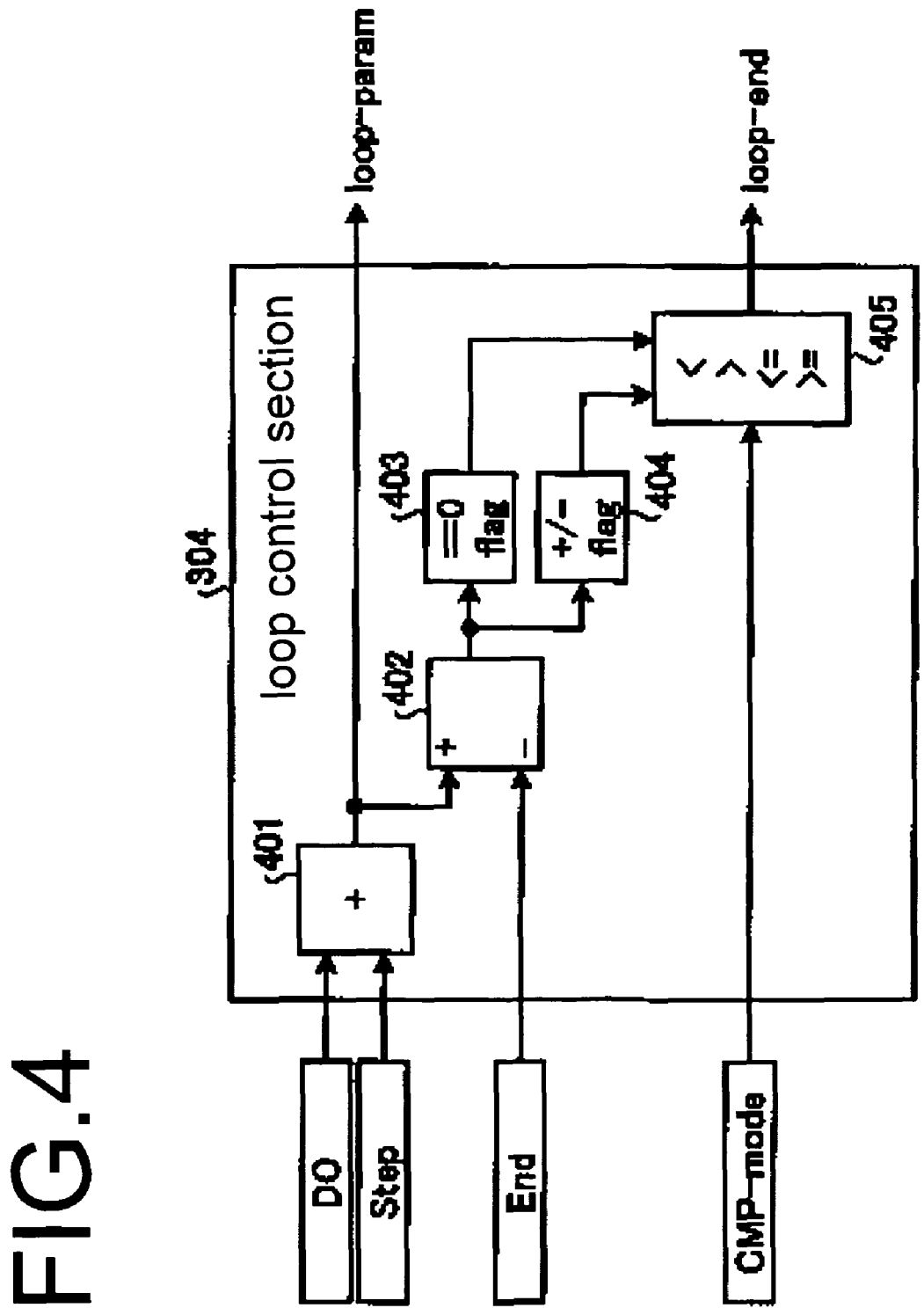
FIG. 4 is a block diagram illustrating an example of a configuration of a loop control section according to the embodiment of the present invention.

FIG. 4 is a block diagram illustrating an example of a configuration of a loop control section. With reference to FIG. 4A, a description is made of a for-loop control and a condition determination performed by the loop control section 304. As illustrated in FIG. 4, in the loop control section 304, there are provided operators 401 to 405.

In the operator 401, a loop variable DO and an increment value Step are inputted and an addition processing is performed. The result of the addition by the operator 401 is outputted as a loop parameter signal (loop-param), and the result is also outputted to the operator 402. In the operator 402, an subtraction calculation between the result of the addition by the operator 401 and a termination value End of the loop variable is performed. The calculation result is outputted to the operator 403 and the operator 404.

If the calculation result by the operator 402 is "0", a flag is outputted from the operator 403. If the calculation result is "other than 0", a flag is outputted from the operator 404. The flag outputted from either of the operator 403 and 404 is inputted to the operator 405.

In the operator 405, it is determined whether the inputted flag satisfies a loop establishment condition, in accordance with a CMP-mode that specifies the loop establishment determination mode. If the operator 405 determines that the flag satisfies the loop establishment condition, a loop end signal (loop-end) is outputted to the output register section 305.

The output register section 305 includes the internal registers "DO", "VO", "CO", and "PRDDO". When an enable signal (output-enable) is inputted from the valid cycle detection section 302, the output register section 305 stores a loop parameter signal (loop-param) from the loop control section 304 in "DO", and outputs the signal to the outside as DO, together with a valid signal (VO) stored in "VO". If the loop parameter signal (loop-param) is not asserted, updating of the output value "DO" is stopped, and a value of a simultaneously outputted valid signal becomes "0".

On the other hand, in the output register section 305, if the loop parameter signal (loop-param) is asserted, outputs of PRDI and CO stored in "PRDDO" and "CO" in the output register section 305 depend on a setting in the internal register "Output-mode" in the configuration register section 301. If the loop parameter signal (loop-param) is not asserted, all output values of "PRDDO" become PRDI "00". Hereinafter, processings for each output mode are described.

Normal Output Mode

In the case of the normal output mode, upon assertion of a loop end signal (loop-end), the output register section 305 outputs "10" from "PRDO", and asserts CO. On the other hand, when the loop end signal (loop-end) is not asserted, the output register section 305 outputs "11" from "PRDO".

Cascade Output Mode

In the case of the cascade output mode, upon assertion of a loop end signal (loop-end), the output register section 305 initializes a value to be stored in "DO" in the output register section 305 to a value in the internal register "Start" in the configuration register section 301. When the stored value in "DO" is initialized to the value in the internal register "Start" in the configuration register section 301, the output register section 305 outputs PRDO "11" from "PRDDO". In the case other than the above-described operations, the output register section 305 outputs PRDO "10" from "PRDDO".

Operation in Counter Circuit

Next, descriptions are made of specific operation contents according to each of settings in the input modes (normal, cascade) and the output modes (normal, cascade) in the counter circuit 112. In timing charts in FIGS. 5 to 7 that are referred to for descriptions below, an output of a two-bit signal is denoted as "2'bxx" for convenience.

Normal Input Mode-Normal Output Mode

Figure 5:
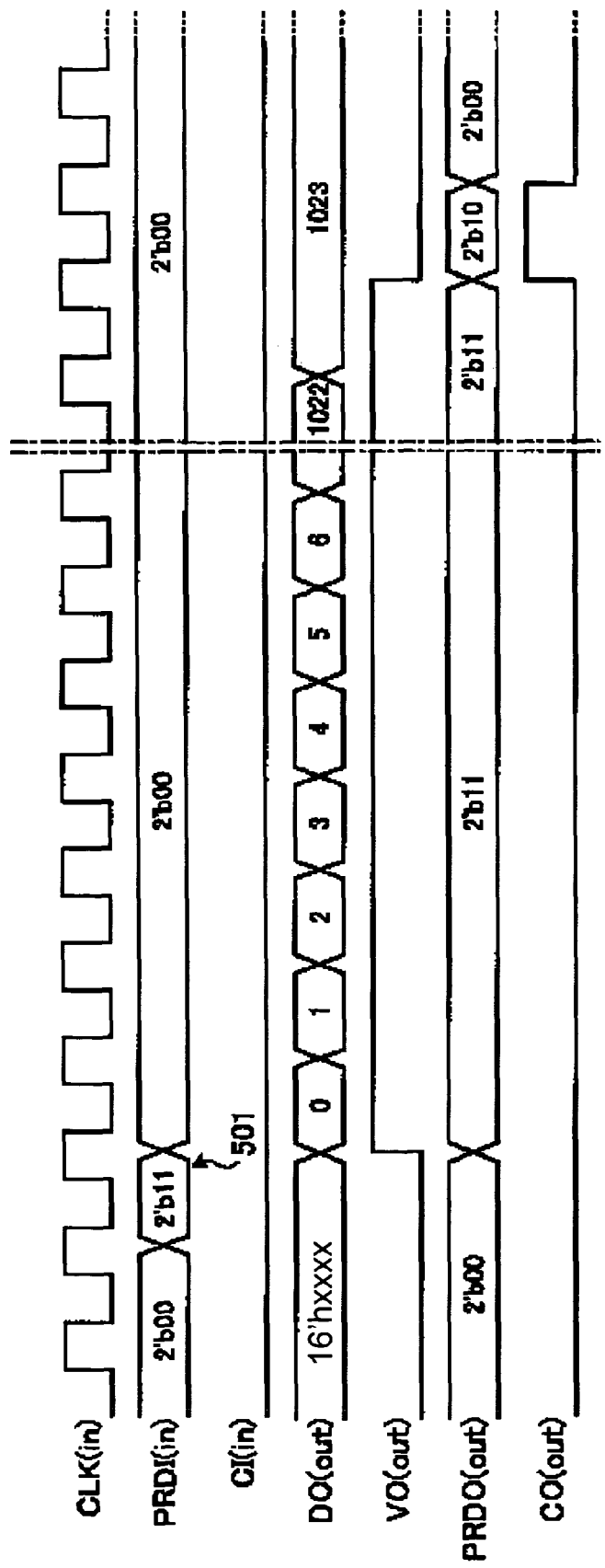
FIG. 5 is a timing chart illustrating an operation performed in the counter circuit in a normal input mode-normal output mode according to the embodiment of the present invention.

FIG. 5 is a timing chart illustrating an operation performed in the counter circuit in the normal input mode-normal output mode. FIG. 5 shows an operation of the counter circuit 112 performed when a control of a single group described as "for(i=0; i<1024; i++)" as a loop processing is performed. Here, an interval setting is set to zero for updating a counted value for each clock.

In the timing chart in FIG. 5, when a two-bit signal PRDI "2'bxx" that is a control signal to be generated in a reconfigurable circuit becomes "11(2b'11)" indicating an establishment, the PRDI serves as a trigger, and a for-loop counting operation is started.

As a characteristic of the operation of the counter circuit set in the normal input mode-normal output mode, an operation of a counting processing is started at PRDI "11" (timing 501), and whether a counted value is valid or invalid is determined based on a value of a valid signal (VO). Specifically, during the counting operation, VO is outputted in a state of "High". The address count can be consecutively performed by setting the interval of the outputs of the counting processing to zero.

During the counting processing, PRDO "11" is outputted. When a loop condition is satisfied, PRDO "10" is outputted. At stop timing of the counting processing, a cascade signal (CO) is asserted by one pulse.

Normal Input Mode-Cascade Output Mode

Figure 6:
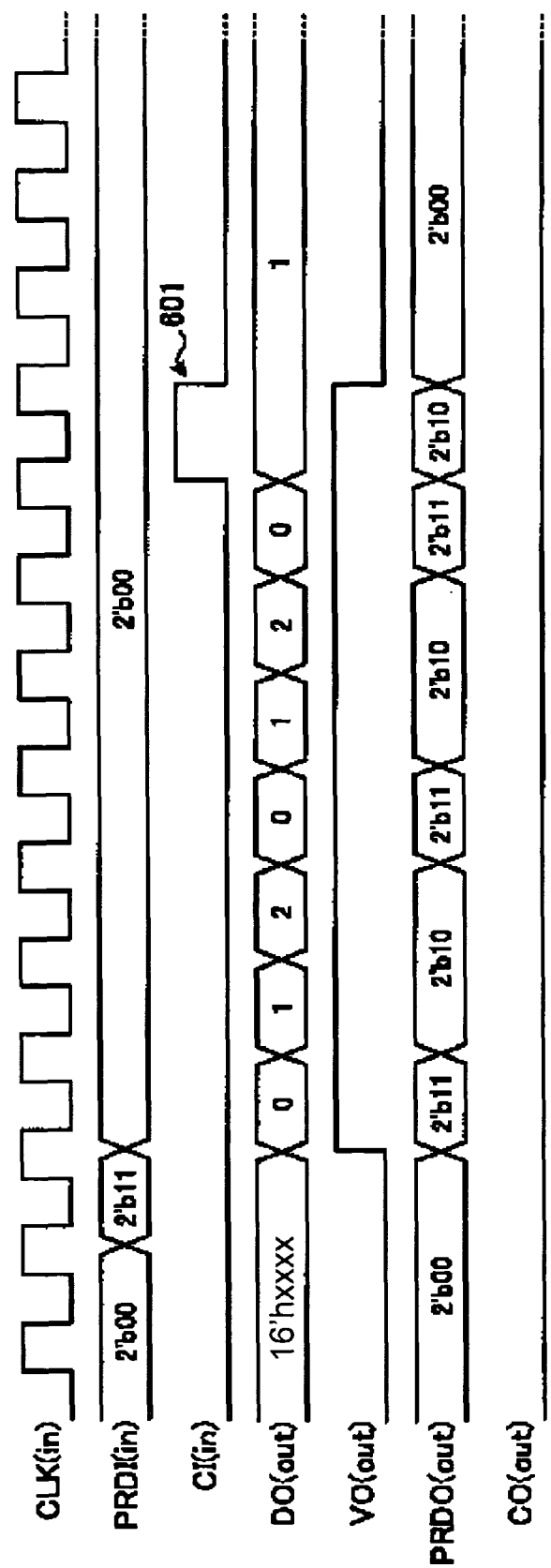
FIG. 6 is a timing chart illustrating an operation performed in the counter circuit in a normal input mode-cascade output mode according to the embodiment of the present invention.

FIG. 6 is a timing chart illustrating an operation in the counter circuit in the normal input mode-cascade output mode. In FIG. 6, "for(i=0; i<3; i++) { ... }" is described as a loop processing. The cascade output mode is set when a counter circuit 112 performing the same for-loop processing is provided on a post-stage side. That is, by setting the cascade output mode, the post-stage counter circuit 112 can be set forward by one step by PRDI "11".

As a characteristic of the operation of the counter circuit set in the normal input mode-cascade output mode, during the loop processing, PRDI "11" is outputted at a timing of a loop initial value. While an operation other than the loop processing is being performed, PRDI "10" is outputted. During the operation, PRDI "00" is outputted. When a cascade signal (CI) is asserted (timing 601), the counting processing is stopped.

Cascade Input Mode-Normal Output Mode

Figure 7A:
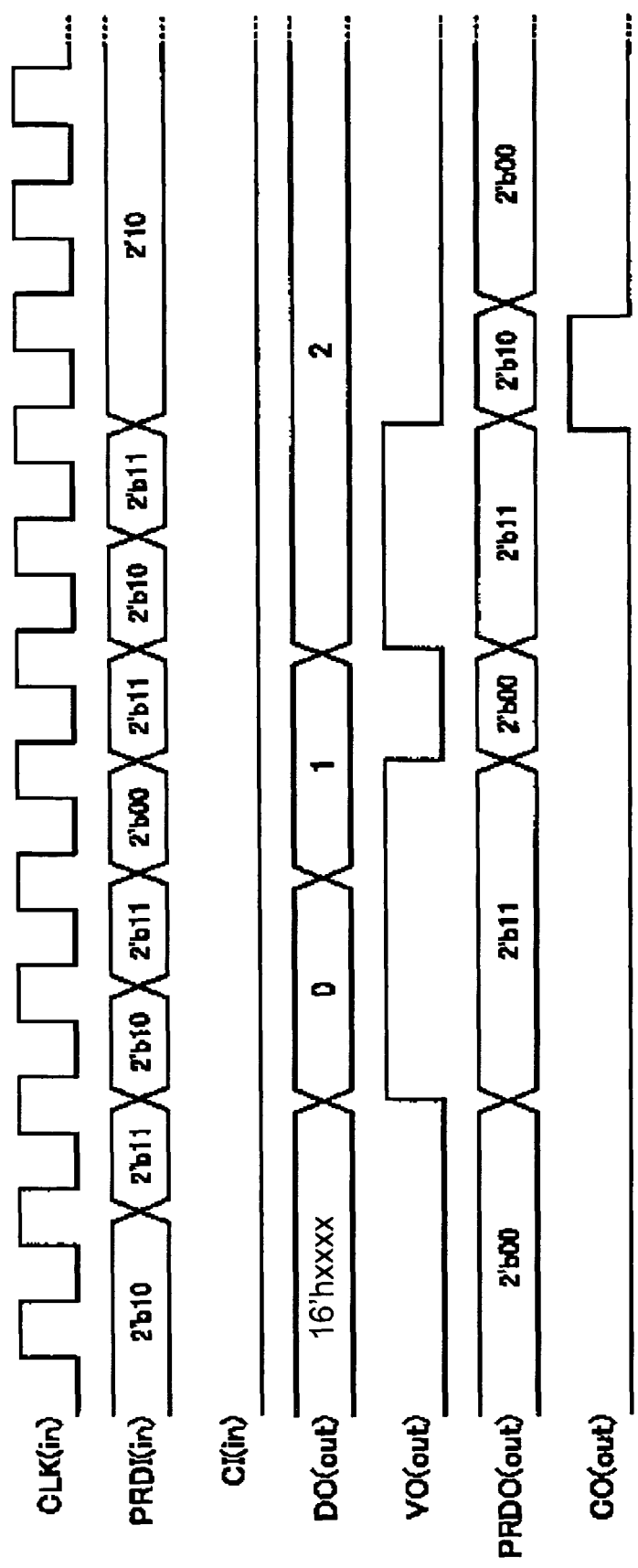
FIGS. 7A and 7B are a timing chart illustrating an operation performed in the counter circuit in a cascade input mode-normal output mode and a cascade input mode-cascade output mode according to the embodiment of the present invention.

FIG. 7A is a timing chart illustrating an operation performed in the counter circuit in the cascade input mode-normal output mode. In FIG. 7A, "for(i=0; i<3; i++) { ... }" is described as a loop processing. The cascade output mode is set when PRDI outputted from a counter set in the cascade output mode in the counter circuit 112 that performs the same for-loop processing is received and an operation of an external loop is performed.

As a characteristic of the operation of the counter circuit set in the cascade input mode-normal output mode, when PRDI "11" is inputted from the pre-stage counter circuit 112, a counted value is updated. When PRDI "10" is inputted, the counted value is held, and when PRDI "0x" is inputted, the counted value is held. However, when the PRDI "0x" is inputted, a valid signal (VO) becomes zero, resulting in an invalid output. When a loop condition is satisfied, a cascade signal (CO) is outputted.

Cascade Input Mode-Cascade Output Mode

Figure 7B:
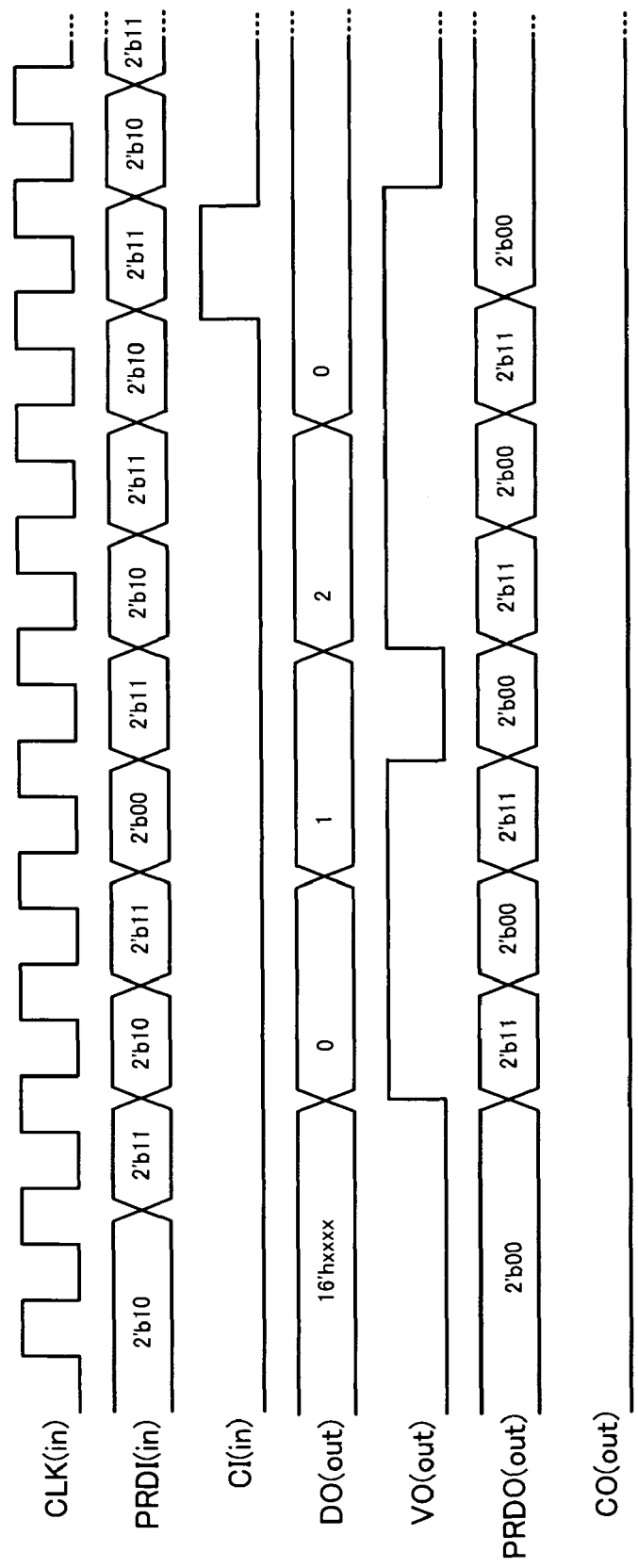

FIG. 7B is a timing chart illustrating an operation performed in the counter circuit in the cascade input mode-cascade output mode. In FIG. 7B, "for(i=0; i<3; i++) { ... }" is described as a loop processing. The cascade output mode is set when PRDI outputted from a counter set in the cascade output mode in the counter circuit 112 that performs the same for-loop processing is received and an operation of an external loop is performed.

As a characteristic of the operation of the counter circuit set in the cascade input mode-normal output mode, when PRDI "11" is inputted from the pre-stage counter circuit 112, a counted value is updated. When PRDI "10" is inputted, the counted value is held, and when PRDI "0x" is inputted, the counted value is held. However, when the PRDI "0x" is inputted, a valid signal (VO) becomes zero, resulting in an invalid output. When a cascade signal (CI) is asserted, the counting proceeding is stopped.

As described above, in the counter circuit 112, based on contexts, a content of loop processing content including an output source of an output signal, an output destination of the output signal, and a condition for outputting the output signal to the output destination, is set by the configuration register section 301. The loop processing that has been set is implemented by the loop control section 304. In the output register, the number of implementations of the implemented loop processing is counted. Based on the counted number of implementations and the above-described condition, the output signal is outputted to the output destination.

Furthermore, upon receiving PRDI "11" by the valid detection section 302, the counter circuit 112 switches the context to a next context that has been set in advance, and sets a content of loop processing based on the switched next context, the loop processing content including an output source of an output signal from each of the set of PEs dynamically reconfigured, an output destination of the output signal, and a condition for outputting the output signal to the output destination. Moreover, in the loop control section 304 and the output counter section 305, a new loop processing can be implemented according to a setting for implementing a loop processing of which the contents have been set based on a switched context.

WORKING EXAMPLES

Next, description is made of specific working examples of dynamic reconfigurable circuit that has the counter circuit according to the above-described embodiment. Here, control contents in the case where a multiple loop is described in the C language, and those in the case where a sequential loop processing is described in the C language, are each described as the working example.

(1) Control in Multiple Loop Processing

Figure 8:
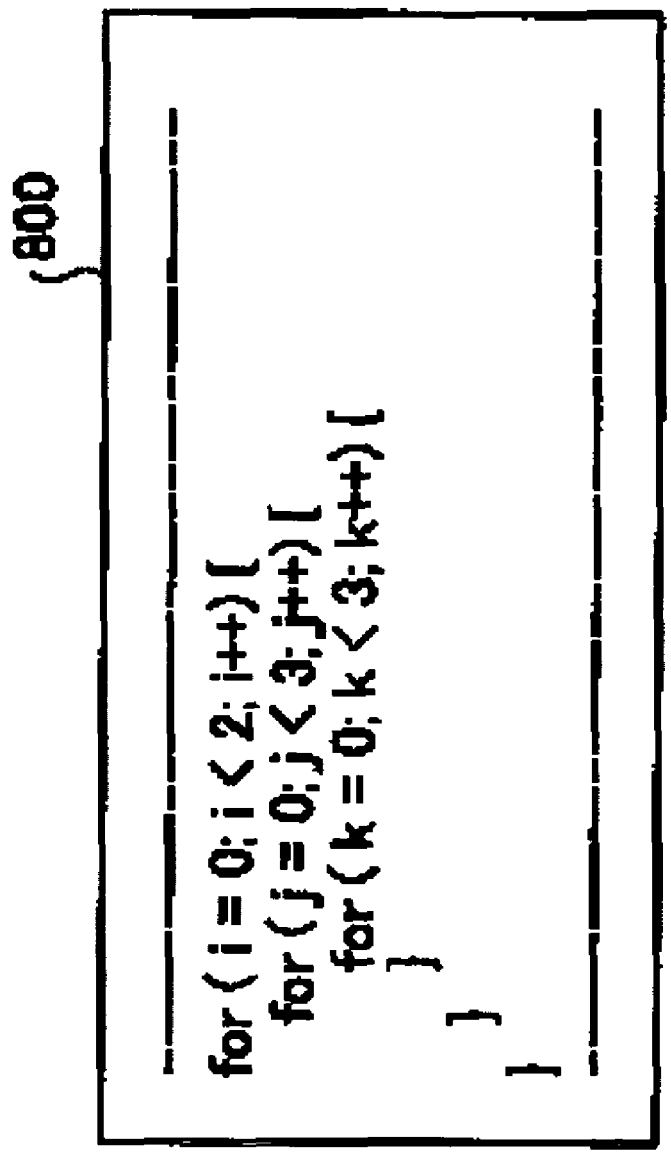
FIG. 8 is a representation illustrating an example of a source code describing a triple loop processing according to the embodiment of the present invention.
Figure 9:
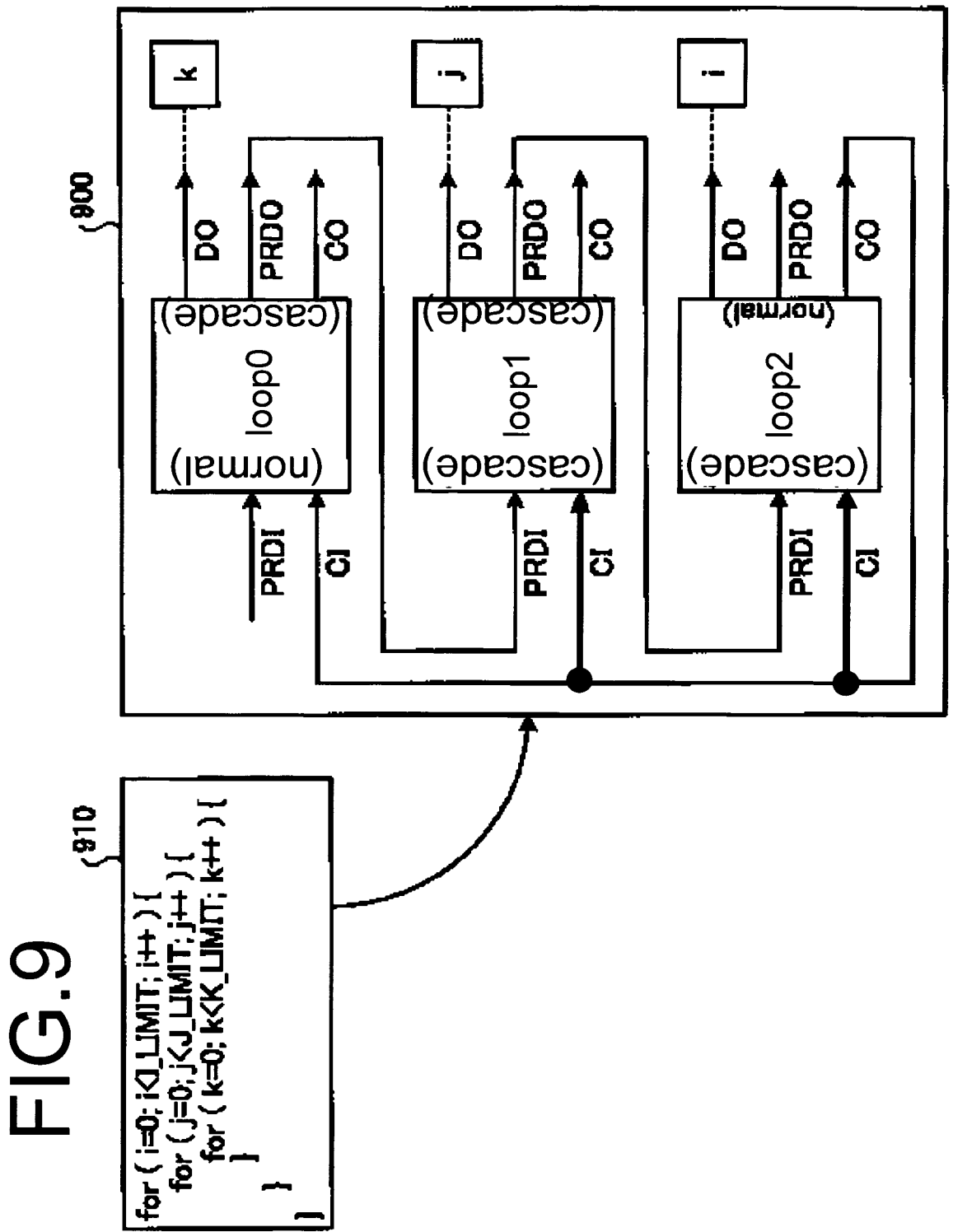
FIG. 9 is a representation illustrating a configuration of the triple loop processing performed in the counter circuit and loop parameters according to the embodiment of the present invention.

First, an explanation is made of a case where a multiple loop control is implemented. FIG. 8 is a representation illustrating an example of a source code describing a triple loop processing. FIG. 9 is a representation illustrating a configuration of a triple loop sequential processing performed in a counter circuit and loop parameters. If a description like a source code 800 in FIG. 8 is performed, a dynamic reconfigurable circuit 900 illustrated in FIG. 9 is configured.

The dynamic reconfigurable circuit 900 includes three loop counters, that is, loops 0 to 2, with loop parameters 910 being set. Here, the loop 1 is cascade-connected to the loop 0, and the loop 2 is cascade-connected to the loop 1. Input-output modes in the loops 0 to 2 are set as follows.

Input-output Mode Setting of Each Counter
Loop 0: normal input mode/cascade output mode
Loop 1: cascade input mode/cascade output mode
Loop 2: Cascade input mode/normal output mode FIG. 10 is a timing chart illustrating input/output values in a triple loop processing. In the timing chart in FIG. 10, in PRDI and PRDO in the loop 0 to the loop 2, in the case of "11" indicating that a satisfaction of a predetermined condition, T (True) is indicated, and in the case of "10" indicating a non-satisfaction of a predetermined condition, F (False) is indicated. Furthermore, in the case of "0x" indicating an invalidity of a predetermined condition, N (Invalid) is indicated.

As illustrated the timing chart in FIG. 10, in the loop 0, a counting processing of an innermost loop that is described in a loop variable k is performed. In the loop 1 that is described in a loop variable j, upon outputting of T from the loop 0, a loop count is started. The loop 1, when satisfying a loop establishment condition, also outputs T to the loop 2 that is described in a loop variable i. The loop 2 is an outermost loop.

(2) Control in Loop Sequential Processing

Figure 11:
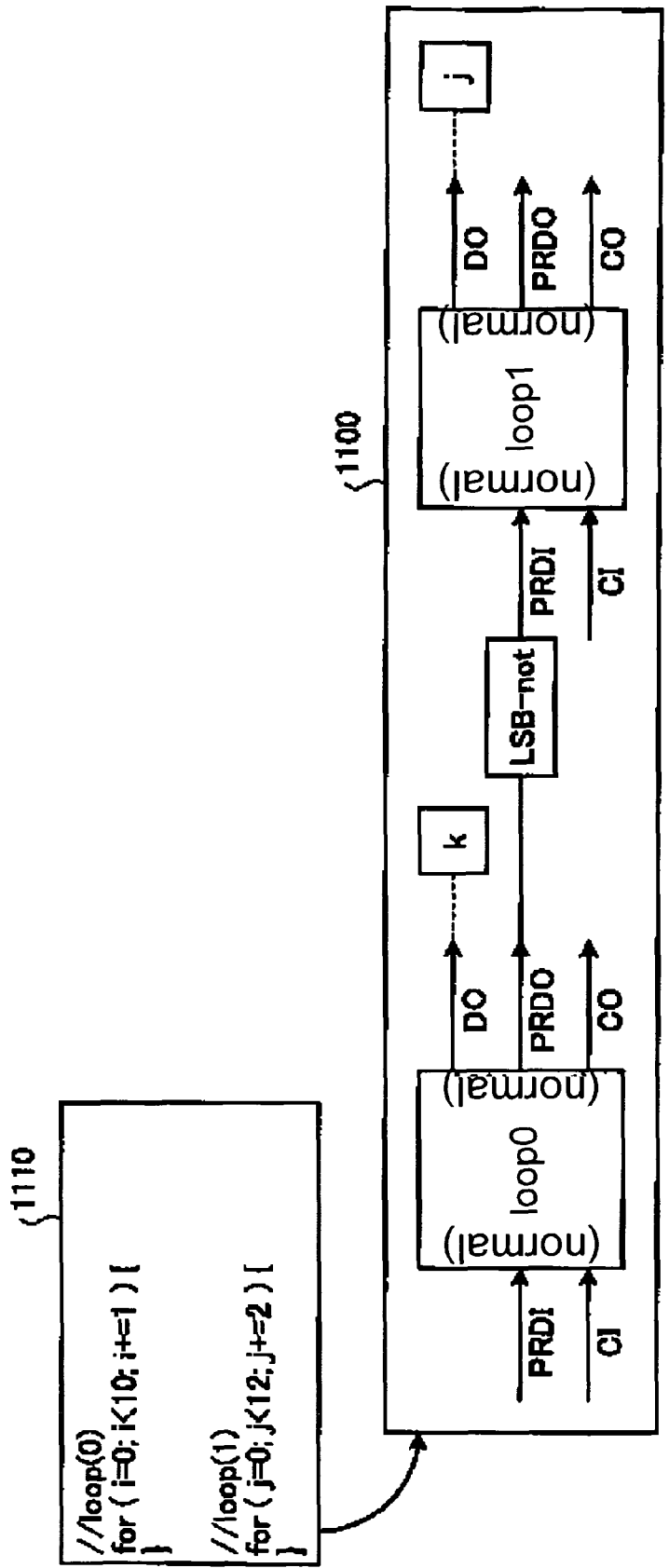
FIG. 11 is a representation illustrating a configuration of a loop sequential processing performed in the counter circuit and an example of a loop parameter according to the embodiment of the present invention.

Next, description is made of a case where a sequential processing for starting a next loop processing is implemented after a specific loop processing has been completed. FIG. 11 is a representation illustrating an example of a configuration of a loop sequential processing performed in a counter circuit and loop parameters. FIG. 12 is a timing chart illustrating input/output values in a loop sequential processing.

Dynamic reconfigurable circuit 1100 in FIG. 11 includes two loop counters, that is, a loop 0 and a loop 1, with loop parameters 1110 being set. Input-output modes in the loop 0 and the loop 1 are set as follows. In the case where PRDO outputted from the loop 0 is delivered as PRDI of the loop 1, it is necessary to invert LSB (Least Significant Bit) in PRDI. This is because, as illustrated in a clock 13 in FIG. 12, a loop processing in the loop 0 is set as a condition non-satisfaction until a loop condition in the loop 0 is satisfied.

Input-output Mode Setting of Each Counter
Loop 0: normal input mode/normal output mode
Loop 1: normal input mode/normal output mode (3) Rewrite Processing of Loop Parameters Now, rewrite processing of loop parameters is described. FIG. 13 is a representation illustrating an example of the rewrite processing of loop parameters. A dynamic reconfigurable circuit 1300 illustrated in FIG. 13 includes a loop 1 and a loop 2. A PE is connected to an output destination of the loop 2. A calculation result by the PE is inputted to the loop 1. Loop parameters 1310 are set in each of the loop 1, the loop 2, and the PE.

Accordingly, when valid data is inputted to DI0 and DI1, rewrite processing of loop parameters set inside the loops 1 and 2 can be implemented in operative association with counting processing. By providing such rewrite processing, a high-versatility description written in C language can be applied to the dynamic reconfigurable circuit 1300, just as it is.

As is evident from the foregoing, according to the counter circuit, the dynamic reconfigurable circuit, and the loop processing control method, it is possible to apply loop processing described in a high-level language to various applications without limiting to a specific application, thereby allowing an implementation of a high-versatility program. Furthermore, by reflecting a value of a condition branch signal (PRDI) on start/termination of a counting processing, switching of contexts can be appropriately realized.

As described above, the counter circuit, the dynamic reconfigurable circuit, and the loop processing control method according to the present invention are useful for devices to which a high-versatility high-level language is applied, and especially, suitable for mobile terminals that are required to realize various functions by limited hardware resources. The turn of the embodiments isn't a showing the superiority and inferiority of the invention. Although the embodiments of the present inventions has been described in detail, it should be understood that the various changes, substitutions, and alterations could be made hereto without departing from the spirit and scope of the invention.

What is claimed is:

1. A dynamic reconfigurable circuit comprising:
a sequencer generating a first signal, a second signal and a PC value, the PC value for implementing a context corresponding to an instruction from a user or an upper program, the context being information which indicates setting of an operation of each of a plurality of processing elements and a connection between the processing elements;
a condition branch signal generator generating a condition branch signal that indicates a start and stop of context switching when the first signal is received by the condition branch signal generator;
a configuration memory storing the context, the configuration memory outputting the context based on the PC value; and
a PE array that receives the second signal and the context, wherein the PE array includes:
the processing elements for performing certain calculations according to a description of the context;
a network circuit switching a connection of input/output value of data of each of the processing elements; and
a counter performing a certain loop processing according to the description of the context and counting the number of loop implementations of the loop processing when the condition branch signal or the second signal is received.

2. The dynamic reconfigurable circuit according to claim 1, wherein the counter includes:
a register which is set to the context that has been set in advance, and sets a content of new loop processing on the basis of the context, the loop processing content including an initial value at a start of the loop processing, a determination formula for determining whether a number of loop implementations satisfies an upper limit of the loop processing, a termination value of a loop variable in accordance with the loop processing, and an increment value to be added to the number of counts when the determination formula is not satisfied; and
the loop controller implements the loop processing.

3. The dynamic reconfigurable circuit according to claim 2, wherein, when the counted number of the loop implementations has satisfied the upper limit of the loop processing, the counter outputs an output signal to the sequencer.

4. The dynamic reconfigurable circuit according to claim 2, wherein, upon receiving a switching signal in accordance with determining whether a number of loop implementations satisfies an upper limit of the loop processing during the loop processing, the counter stops the count of the loop processing; and wherein, upon receiving the switching signal when the loop processing is not performed, the counter counts the numbers of the new loop processing performed in accordance with the content of the new loop processing.

5. The dynamic reconfigurable circuit according to claim 1, further comprising another counter circuit that is the same as the counter circuit, wherein the loop processing is implemented for each counter circuit.

6. A loop processing control method in a dynamic reconfigurable circuit having processing elements that are reconfigurable and at least one counter circuit implementing optional loop processing, the loop processing control method comprising:

generating a condition branch signal that indicates a start and stop of context switching when the signal is received;

switching setting of an optional operation for each of the processing elements based on a context, when the processing elements receive the context, the context being information which indicates setting of an operation of each of a plurality of processing elements and a connection between the processing elements;

setting a loop processing content on the basis of the context to be implemented in the at least one counter circuit, the context including an initial value at a start of the loop processing, a determination formula for determining whether a number of loop implementations satisfies an upper limit of the loop processing, a termination value of a loop variable corresponding to the loop processing, and an increment value to be added to the number of counts when the determination formula is not satisfied;

implementing the loop processing of which the content has been set, in the at least one counter circuit and each of the processing elements; and counting the number of implementations of the loop processing implemented, and outputting an output signal to an output destination on the basis of the counted number of implementations when the condition branch signal or the second signal is received by the counter circuit.

7. The loop processing control method according to claim 6, further comprising:

upon receipt of the condition branch signal setting a content of a new loop processing in accordance with a new for-loop sentence described by a code in the program on the basis of the context in the at least one counter circuit, the content of the new loop processing including an initial value at a start of the new loop processing, a determination formula determining whether a number of loop implementations satisfies an upper limit of the new loop processing, a termination value of a loop variable in accordance with the new loop processing, and an increment value to be added to the number of counts when the determination formula is not satisfied and implementing a new loop processing.

8. The loop processing control method according to claim 6, wherein the dynamic reconfigurable circuit has another counter circuit that is the same as the counter circuit, and the loop processing is implemented for each of the counter circuits.

* * * * *